United States Patent [19]

Perr et al.

[11] 4,207,035
[45] Jun. 10, 1980

[54] TURBOCHARGER ASSEMBLY

[75] Inventors: Julius P. Perr; George L. Muntean, both of Columbus, Ind.

[73] Assignee: Cummins Engine Company, Inc., Columbus, Ind.

[21] Appl. No.: 864,629

[22] Filed: Dec. 27, 1977

[51] Int. Cl.² .......................................... F02B 37/00
[52] U.S. Cl. ..................................... 417/407; 60/602; 60/605; 415/111
[58] Field of Search ................. 60/602; 277/3, 53, 55, 277/DIG. 8; 415/111, 112, 148, 149 R; 417/405, 406, 407

[56] References Cited

U.S. PATENT DOCUMENTS

| 2,480,095 | 8/1949 | Buchi | 417/406 |
|---|---|---|---|
| 2,646,210 | 7/1953 | Kohlmann et al. | 417/407 X |
| 3,021,146 | 2/1962 | Sommer et al. | 277/3 |
| 3,025,036 | 3/1962 | Kumm et al. | 415/149 R UX |
| 3,038,318 | 6/1962 | Hanny | 417/407 X |
| 3,090,546 | 5/1963 | Woollenweber | 415/111 |
| 3,099,433 | 7/1963 | Wagner et al. | 415/149 R |
| 3,420,434 | 1/1969 | Swearingen | 417/407 X |

FOREIGN PATENT DOCUMENTS

| 2437530 | 2/1976 | Fed. Rep. of Germany | 417/407 |
|---|---|---|---|
| 1262633 | 4/1961 | France | 415/112 |
| 2285514 | 4/1976 | France | 60/602 |
| 924760 | 5/1963 | United Kingdom | 60/602 |

Primary Examiner—Michael Koczo
Attorney, Agent, or Firm—Neuman, Williams, Anderson & Olson

[57] ABSTRACT

A turbocharger assembly is provided for use with an internal combustion engine. The assembly includes a compressor chamber having a compressor wheel disposed therein and a turbine chamber having a turbine wheel disposed therein. The two wheels are affixed to a rotating shaft. A lubricated bearing assembly is disposed between the chambers and encompasses the shaft. A dynamic first seal encompasses the shaft and is disposed between the bearing assembly and the compressor chamber. A second seal encompasses the shaft and is disposed between the bearing assembly and the turbine chamber. Controlled first means is provided for braking rotation of the shaft. Second means is provided which, when the first means is in a shaft-braking mode, causes a predetermined gaseous pressure to be exerted on the first seal inhibiting migration of the lubricant from the bearing assembly to the compressor chamber.

5 Claims, 4 Drawing Figures

TURBOCHARGER ASSEMBLY

BACKGROUND OF THE INVENTION

In turbochargers where the turbine speed ranges from 100,000 rpm to 110,000 rpm, labyrinth-type seals are frequently utilized so as to minimize bearing and seal wear. Such seals, while effective when the turbine and compressor wheels are operating at normal high speeds, nevertheless are plagued with the problem of lubricant migration into the compressor chamber when rotation of the wheels is stopped or is at idling speed. To compensate for the dilemma, various means have heretofore been provided which were beset with one or more of the following shortcomings: (a) complex and costly construction and prone to frequent malfunction; (b) resulted in increased oil consumption and carbonizing of various components of both the engine and turbocharger; and (c) could not be readily installed in existing turbochargers without requiring extensive modifications to the various components of the turbocharger.

SUMMARY OF THE INVENTION

Thus, it is an object of the invention to provide an improved turbocharger assembly which avoids the aforenoted shortcomings.

It is a further object of the invention to provide an improved turbocharger assembly which is capable of being utilized with a variety of internal combustion engines.

Further and additional objects will appear from the description, accompanying drawings and appended claims.

In accordance with one embodiment of the invention an improved turbocharger assembly is provided which includes a compressor chamber in which a compressor wheel is disposed and a turbine chamber in which a turbine wheel is disposed. The two wheels are affixed to a common rotating shaft. A lubricated bearing assembly is disposed between the chambers and encompasses the shaft. A dynamic first seal encompasses the shaft and is disposed between the compressor chamber and the bearing assembly. A second seal encompasses the shaft and is disposed between the turbine chamber and the bearing assembly. Controlled first means is provided for braking rotation of the shaft. A second means is provided which, when the first means is in a shaft-braking mode, causes a predetermined gaseous pressure to be exerted on the first means inhibiting lubricant migration from the bearing assembly to the compressor chamber.

For a more complete understanding of the invention reference should be made to the drawings wherein.

DESCRIPTION

Figure 4:
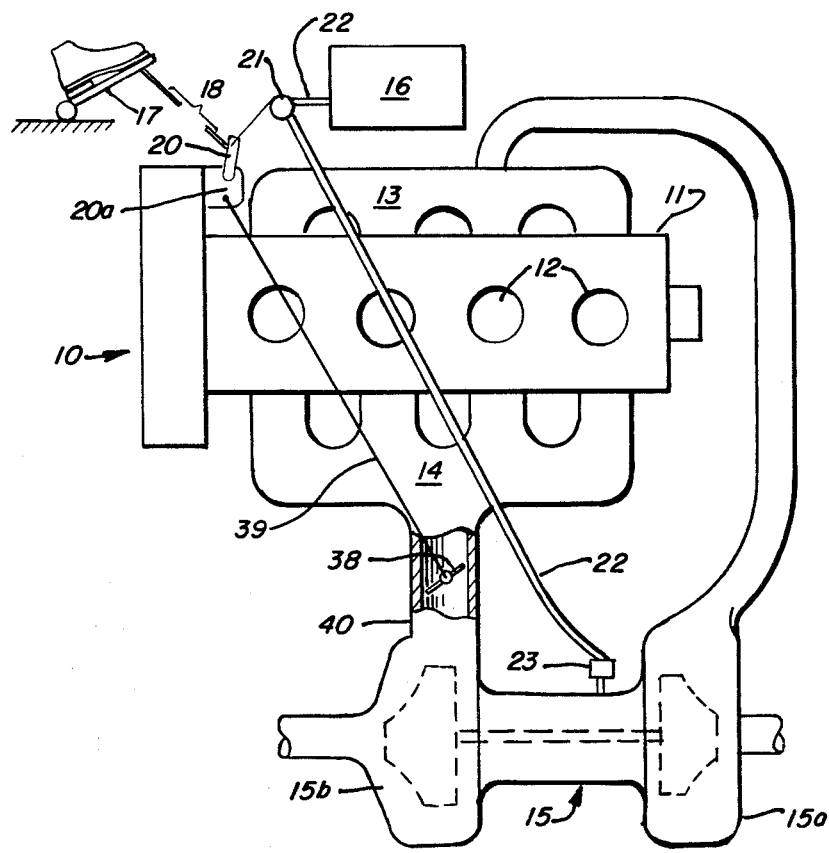
FIG. 4 is a fragmentary schematic view of an internal combustion engine showing one improved turbocharger assembly attached thereto.

Referring now to the drawings and more particularly to FIG. 4, an internal combustion (i.e., four cylinder diesel) engine 10 is shown schematically. The basic components shown in FIG. 4 are: an engine block 11 in which the cylinders 12 are formed; an intake manifold 13 mounted on one side of the engine block; an exhaust manifold 14 mounted on the opposite side of the block; a turbocharger assembly 15 having a compressor section 15a connected to the intake manifold 13 and a turbine section 15b connected to the exhaust manifold 14; a compressed air supply 16; and a manually operated brake pedal 17. The brake pedal 17 is adapted to actuate the primary brake system through compressed air obtained from supply 16. The pedal 17 through a suitable linkage 18 is connected to a lever 20 of a throttle valve 20a mounted on the engine. Movement of lever 20 is transmitted to a suitable switch valve 21 mounted within an air pressure line 22 which connects the supply 16 to a connection 23 provided on the turbocharger assembly 15.

Figure 3:
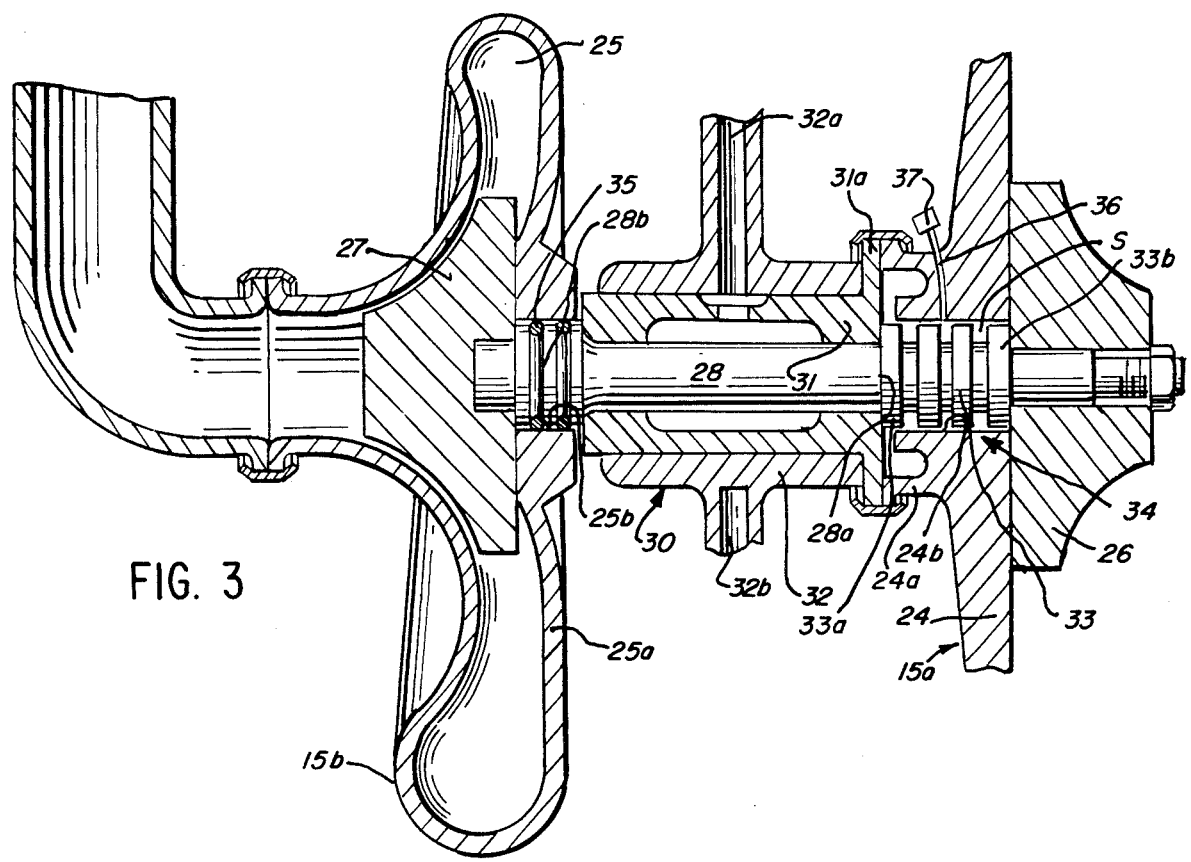
FIG. 3 is similar to FIG. 1 but showing a second form of the improved turbocharger assembly.

One form of the turbocharger assembly 15 utilized with the engine 10 of FIG. 4 is shown in greater detail in FIG. 3. Assembly 15, as aforenoted, embodies a compressor section 15a and a turbine section 15b. Each section is provided with a chamber 24, 25. Chamber 24 accommodates therein a compressor wheel 26 and chamber 25 accommodates therein a turbine wheel 27. The configurations of wheels 26, 27 may vary over a wide range depending upon the capacity of the turbocharger assembly desired and the size of engine to which it is connected. The wheels 26, 27 are affixed to opposite ends of a common shaft 28, the latter being mounted for rotation about its longitudinal axis.

Disposed between the compressor chamber 24 and turbine chamber 25 is a lubricated bearing assembly 30. Assembly 30 includes a sleeve member 31 having a flange 31a formed on the end thereof adjacent the compressor section 15a. The flange is connected by suitable means to one side of a housing 24a defining the chamber 24. The sleeve 31 is encompassed by a suitable casing 32, the latter having formed on the upper portion thereof an inlet port 32a and on the underside thereof an outlet port 32b. Port 32a is connected to the discharge side of a suitable pump, not shown, for the lubricating oil. Port 32b, on the other hand, is connected to a reservoir, not shown, for the lubricating oil. During operation of the turbocharger assembly lubricating oil under pressure is circulated through the bearing assembly.

Surrounding the portion of shaft 28 which extends through the side of the housing 24a is a bushing 33 which is shrunk fit on the shaft 28 and rotates therewith. The housing 24a is provided with a suitable opening 24b to accommodate the bushing 33. One end 33a of the bushing 33 engages a shoulder 28a formed on shaft 28 and the opposite end 33b engages the backside of compressor wheel 26. The outer periphery of bushing 33 is provided with a plurality of annular grooves which coact with the housing opening 24b to form a labyrinth seal 34. The operation of seal 34 will be discussed more fully hereinafter.

The opposite end of shaft 28, that is the end adjacent the turbine section 15b, is formed into a collar 28b which extends through an opening 25b formed in a housing 25a defining the turbine chamber 25. The periphery of collar 28b is provided with a plurality of annular grooves in which are disposed metallic seal rings 35.

The turbine wheel 27 may be affixed to the collared end of shaft 28 so that the backside of wheel 27 abuts collar 28b, or in some instances the wheel may be made integral with the end of the shaft. In either construction, the collar 28b and wheel 27 rotate as a unit, and the seal rings 35 prevent migration of the lubricating oil into chamber 25 or the migration of the exhaust gases into the bearing assembly 30.

Under normal rotational speeds of the shaft 28, the lubricating oil becomes entrapped within the grooves formed in the periphery of bushing 33 and the entrapped oil serves to block any migration of the oil axially along seal 34 into compressor chamber 24. When, however, the shaft is braked or otherwise caused to rotate at idling speed or less, the entrapped oil will not provide the necessary blockage for oil migration, and severe problems will occur. The invention herein described is intended to avoid such problems.

It will be noted in FIG. 3, that compressor housing 24a is provided with an internal duct 36 having the concealed, or inner, end thereof communicating with the spacing S which is formed between the periphery of bushing 33 and the opening 24b of the housing 24. The juncture between the duct inner end and the spacing S is spaced from the end 33a of the bushing 33. The opposite, or outer, end of the duct 36 is provided with an exposed, suitable fitting 37 which is adapted to receive the end of a line or tube 22 connected to the compressed air supply 16, see FIG. 4. Thus, when the foot pedal 17 is depressed so as to actuate the primary braking system, the valve 21 is automatically moved to an open position whereupon line 22 is charged with compressed air and the space S is also charged with compressed air thereby blocking any lubricant migration through the labyrinth seal 34 as the rotational speed of shaft 28 is reduced to idling speed or less.

To effect reduction, or braking, of the shaft rotational speed, an exhaust braking valve 38 may be incorporated in a duct section 40 connecting the exhaust manifold 14 to the turbine housing 25a, see FIG. 4. When the valve 38 assumes a closed position from its normally open position, an exhaust manifold pressure builds up within the manifold itself causing power output of the engine to be significantly reduced and at the same time cause the rotation of the turbine wheel 27 to slow down. When the valve 38 is in its closed position, there is still under normal conditions a small amount of exhaust gas flow past the valve so as to cause continuous rotation of the turbine and compressor wheels. The movement of the braking valve 38 may be effected by a separate linkage 39 extending from the foot pedal to the valve. In such an arrangement, the foot pedal would be depressed a certain amount before the exhaust valve 38 is moved away from its normally open position. In another arrangement, a manual control, not shown, separate from the foot pedal 17 may be utilized to adjust valve 38. In this latter arrangement, the manual control would also be connected to the compressed air switch valve 21 which would be actuated to an open position when the valve 38 is moved to a closed position.

Figure 1:
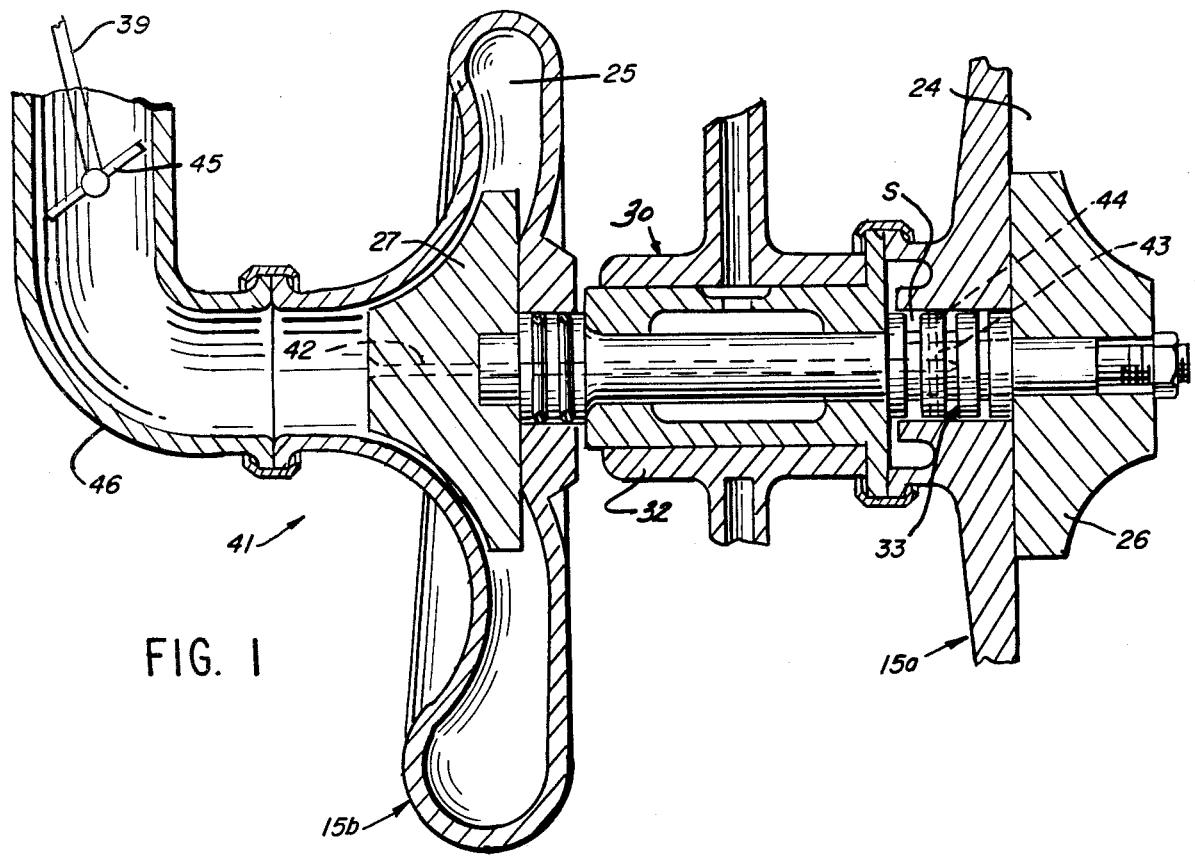
FIG. 1 is a fragmentary sectional view of one form of the improved turbocharger assembly taken along the axis of rotation of the turbine and compressor wheels.
Figure 2:
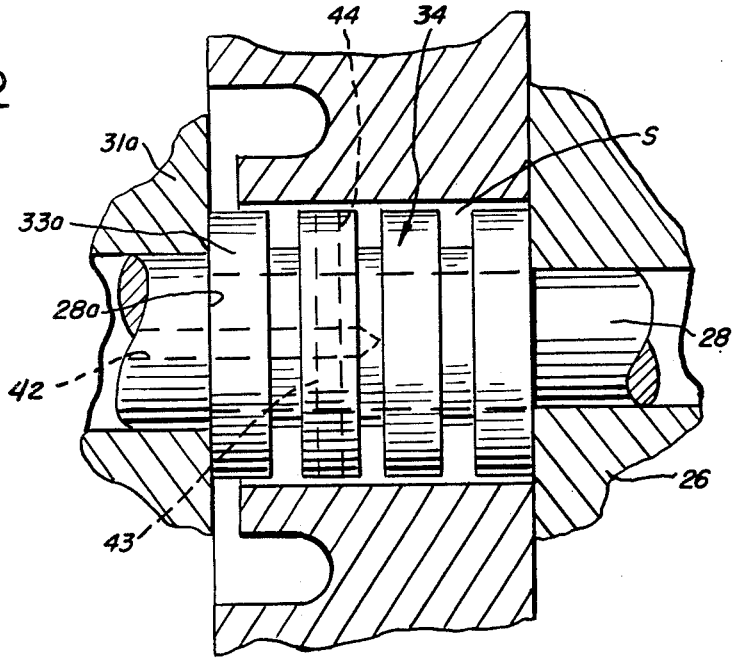
FIG. 2 is an enlarged fragmentary sectional view of the labyrinth seal embodied in the turbocharger assembly of FIG. 1.

Another form of the improved turbocharger assembly 41 is disclosed in FIGS. 1 and 2 wherein the various components thereof are the same as those previously described with respect to turbocharger assembly 15 except that in assembly 41 there is no internal duct 36 provided in the compressor housing 24a, but in place thereof there is an axial bore 42 formed in the turbine wheel 27 and shaft 28 which terminates at one end in turbine chamber 25 and at the other end in a port 43 which extends transversely of the shaft rotary axis. Transverse port 43 is aligned with and communicates with a transverse port 44 formed in bushing 33; port 44 communicates with the spacing S. A further difference between assemblies 15 and 41 is that in the latter the exhaust brake valve 45 is located in a discharge duct 46 for the turbine section 15b. In other words, the valve 45 is located downstream of the turbine wheel 27 rather than upstream as shown in FIG. 4. The valve 45 may be manually actuated by a foot pedal or hand lever.

Thus, with assembly 41, when valve 45 is moved to a closed position from its normally open position, the buildup of exhaust gas pressure within duct 46 and chamber 25 is transmitted through bore 42 and ports 43 and 44 to provide a pressure barrier within the spacing S of the dynamic labyrinth seal 34 and prevent lubricant migration as the pressure buildup causes braking or slowdown of the shaft rotation.

It will be noted with either improved turbocharger assembly that the problems associated with labyrinth-type seals, when the rotation of the shaft is below a predetermined speed, have been effectively overcome without requiring extensive complex, costly and bulky modifications to be made to the engine itself or to the turbocharger assembly associated therewith.

We claim:

1. A turbocharger assembly comprising a compressor section having a first chamber formed therein, a turbine section having a second chamber formed therein, the latter including an inlet and an outlet, a first passage connecting said second chamber inlet to an exhaust gas source; a second passage connected to said second chamber outlet and extending downstream therefrom; a rotatable shaft having a first portion disposed within said first chamber and a second portion disposed within said second chamber; a first impeller means on said shaft first portion; a second impeller means on said shaft second portion; manually operable valve means disposed within said second passage for braking shaft rotation, said valve means being mounted for adjustment between braking and non-braking modes, when in said braking mode, said valve means substantially closing off said second passage and effecting build-up of a substantial exhaust gas back pressure within said second chamber; a lubricated bearing assembly for said shaft disposed intermediate said compressor and turbine sections; a dynamic first seal encompassing said shaft and disposed intermediate said first chamber and said bearing assembly; a second seal encompassing said shaft and disposed intermediate said second chamber and said bearing assembly; and means communicating with said second chamber and a portion of said first seal spaced longitudinally from said bearing assembly for transmitting the exhaust gas back pressure to said first seal portion and inhibiting migration of lubricant from said bearing assembly to said first chamber when said valve means is in the braking mode.

2. The turbocharger assembly of claim 1 wherein the first seal is a labyrinth-type seal.

3. The turbocharger assembly of claim 1 wherein the manually operable valve means includes a linkage connected to a brake pedal remotely disposed relative to the second passage.

4. The turbocharger assembly of claim 1 wherein the means communicating with the second chamber and the first seal portion includes an elongated internal passageway formed in said shaft and having one end terminating at said second chamber and the opposite end terminating at said first seal portion.

5. The turbocharger assembly of claim 4 wherein the internal passageway includes an axial first bore and an angularly extending second bore intersecting said first bore; one end of said first bore communicating with said second chamber and one end of said second bore communicating with the surface segment of said first seal portion.

* * * * *